(12) United States Patent
Dunn

(10) Patent No.: US 11,111,847 B2
(45) Date of Patent: Sep. 7, 2021

(54) METHOD AND SYSTEM OF CARBON SEQUESTRATION AND CARBON NEGATIVE POWER SYSTEM

(71) Applicant: ENHANCED ENERGY GROUP, LLC, West Kingston, RI (US)

(72) Inventor: Paul M Dunn, West Kingston, RI (US)

(73) Assignee: Enhanced Energy Group, LLC, W. Kingston, RI (US)

( * ) Notice: Subject to any disclaimer, the term of this patent is extended or adjusted under 35 U.S.C. 154(b) by 0 days.

(21) Appl. No.: 16/639,253

(22) PCT Filed: Aug. 15, 2018

(86) PCT No.: PCT/US2018/000163
§ 371 (c)(1),
(2) Date: Feb. 14, 2020

(87) PCT Pub. No.: WO2019/035896
PCT Pub. Date: Feb. 21, 2019

(65) Prior Publication Data
US 2020/0271050 A1  Aug. 27, 2020

Related U.S. Application Data

(60) Provisional application No. 62/545,497, filed on Aug. 15, 2017.

(51) Int. Cl.
*F02B 47/10* (2006.01)
*F01K 23/06* (2006.01)
(Continued)

(52) U.S. Cl.
CPC ............ *F02B 47/10* (2013.01); *F01K 23/065* (2013.01); *F01K 23/067* (2013.01); *F01K 23/10* (2013.01); *F02M 26/35* (2016.02); *F02M 26/36* (2016.02)

(58) Field of Classification Search
CPC ........ F02B 47/10; F02M 26/35; F02M 26/36; F01K 23/065; F01K 23/067; F01K 23/10; F01K 25/08; F01K 25/103
(Continued)

(56) References Cited

U.S. PATENT DOCUMENTS

| 6,045,603 A * | 4/2000 | Chen ..................... B01D 53/047 |
| | | 95/101 |
| 8,156,726 B1 * | 4/2012 | Dunn ........................ F02C 7/10 |
| | | 60/39.511 |

(Continued)

*Primary Examiner* — Erick R Solis

(57) ABSTRACT

An improved method and system of carbon sequestration of a pyrolysis piston engine power system is provided. The system includes a pyrolysis piston engine for generating power and exhaust gas and a water cooling and separation unit which receives the exhaust gas and cools and removes water from the exhaust gas to create C02 gas supply. The system also includes a mixing pressure vessel which receives at least a portion of the C02 gas supply from the water cooling and separation unit and mixes the C02 gas supply with oxygen to create a working fluid to be provided to the piston engine and an oxygen generator for providing oxygen to the mixing pressure vessel. The system also includes a pyrolysis interface for inputting byproducts from a pyrolysis system, wherein the pyrolysis interface comprises a pyrolysis gas interface and a pyrolysis gas/oil interface.

3 Claims, 13 Drawing Sheets

(51) Int. Cl.
*F01K 25/08* (2006.01)
*F01K 23/10* (2006.01)
*F02M 26/36* (2016.01)
*F02M 26/35* (2016.01)

(58) Field of Classification Search
USPC ............... 60/39.52, 278; 123/568.11, 568.12
See application file for complete search history.

(56) References Cited

U.S. PATENT DOCUMENTS

| | | | | |
|---|---|---|---|---|
| 8,490,397 B2* | 7/2013 | Lehar | ........................ | F02C 1/10 |
| | | | | 60/651 |
| 8,776,532 B2* | 7/2014 | Allam | .................. | F25J 3/04545 |
| | | | | 60/780 |
| 8,869,889 B2* | 10/2014 | Palmer | ..................... | F23J 15/00 |
| | | | | 166/260 |
| 9,216,903 B2* | 12/2015 | McKenna | ................. | C01B 3/48 |
| 10,280,377 B1* | 5/2019 | Nestler | ................... | C10B 53/02 |
| 10,584,633 B2* | 3/2020 | Dunn | ........................ | F02C 3/34 |
| 2004/0003592 A1* | 1/2004 | Viteri | ....................... | B60K 6/48 |
| | | | | 60/651 |
| 2011/0138766 A1* | 6/2011 | ELKady | ................... | F02C 3/34 |
| | | | | 60/39.24 |
| 2011/0192139 A1* | 8/2011 | Paik | ........................ | F01N 3/005 |
| | | | | 60/274 |
| 2012/0023956 A1* | 2/2012 | Popovic | ............... | F25J 3/04569 |
| | | | | 60/772 |
| 2014/0060013 A1* | 3/2014 | Dunn | ................. | C01B 13/0259 |
| | | | | 60/278 |

\* cited by examiner

| $O_2$ Purity | $CO_2$ Purity | Representing |
|---|---|---|
| % Vol @ Intake, before EGR | % Vol, Hot Exhaust | |
| 21% (Air) | 2% | Recuperated Turbine, No SCC |
| 21% (Air) | 3% | Typical Turbine, No SCC |
| 21% (Air) | 6% | Typical Lean Burn Piston, No SCC |
| 21% (Air) | 10% | Typical Rich Burn Piston, No SCC |
| 25% | 14% | SCC Rich Burn Piston |
| 35% | 21% | SCC Rich Burn Piston |
| 50% | 25% | SCC Rich Burn Piston |
| 70% | 40% | SCC Rich Burn Piston |
| 91% | 60% | SCC Rich Burn Piston |

FIG. 10

| | Gross Power (hp) | O₂ Plant Intake (lb/hr) | Air Intake (lb/hr) | SCC Fraction (recirc/total) | Raw $CO_2$ % (Wet and Dry) | Exhaust Temp and % $O_2$ |
|---|---|---|---|---|---|---|
| Air (21%) | 4510 | 0 | 47002 | 0.00 | 5.1%, 5.7% | 892 F, 9.4% |
| 28% | 4443 | 22000 | 25000 | 0.40 | 8.5%, 10% | 892 F, 10.4% |
| 36% | 4384 | 30000 | 15000 | 0.59 | 12.4%, 14.5% | 903 F, 10.5% |
| 43% | 4339 | 33000 | 10000 | 0.69 | 16.6%, 19.4% | 905 F, 10.0% |
| 50% | 4296 | 36000 | 7200 | 0.74 | 20.0%, 23.4% | 917 F, 10.8% |

FIG. 11

| $O_2$ and Air Before SCC | Gross Power (hp) | SCC Atmosphere (% $O_2$) | Exhaust Flow (lb/hr) | SCC Fraction and Intake Mol. Weight | Raw CO2 % (Wet and Dry) | Exhaust Temp and % $O_2$ |
|---|---|---|---|---|---|---|
| Air (21%) | 2656 | 20.7% | 116772 | 0.00 / 28.9 | 2.7%, N/A | 1026 F, 15% |
| 34% $O_2$ Mix | 2305 | 20.4% | 113952 | 0.72 / 29.2 | 9.2%, 10.6% | 1044 F, 15% |
| 34% $O_2$ Mix | 2316 | 12.7% | 117910 | 0.81 / 29.6 | 13.6%, 15.8% | 1039 F, 7% |
| 34% $O_2$ Mix | 2312 | 7.4% | 114471 | 0.84 / 29.8 | 16.7%, 19.4% | 1062 F, 2% |
| 43% $O_2$ Mix | 2362 | 19.8% | 115654 | 0.82 / 30.0 | 15%, 17.5% | 1073 F, 14% |
| 43% $O_2$ Mix | 2298 | 13.3% | 119129 | 0.85 / 30.4 | 18.8%, 22% | 1049 F, 8% |
| 43% $O_2$ Mix | 2276 | 7.7% | 118202 | 0.88 / 30.7 | 22.2%, 26% | 1054 F, 2% |

FIG. 12

METHOD AND SYSTEM OF CARBON SEQUESTRATION AND CARBON NEGATIVE POWER SYSTEM

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

U.S. provisional patent application 62/545,497 entitled "Improved Method of Carbon Sequestration", naming Paul M. Dunn as inventor, filed 15 Aug. 2017.

BACKGROUND

1. Field of Use

The invention generally relates to semi-closed cycle power systems and more particularly power systems including carbon capture equipment or at least having concentrated exhaust $CO_2$ levels, enabling lower cost $CO_2$ capture equipment to be employed. Furthermore, this invention relates to pyrolysis systems, or gasification systems, which via thermal decomposition or partial (oxygen starved) combustion produce a synthesis gas (carbon monoxide, carbon dioxide, methane, hydrogen, and other hydrocarbon gases) and other fuels, from a solid feedstock.

2. Description of Prior Art (Background)

Conventional power systems, whether internal or external combustion, burn fuel with air and generally vent the combustion products (exhaust/flue gas) to the air (or via underwater interface to the air). This is true of natural gas, gasoline, and diesel piston engines, and also of gas turbines, jet engines, or even steam boiler-based power plants. Emissions of the untreated flue gas to the air, while simple to execute, is not desirable for environmental reasons. Gases such as SO2, NOx, CO, HC (unburned hydro carbon) and more recently CO2 are defined as pollutants and are regulated. In special purpose applications, in particular for undersea applications, the requirement to tie the system exhaust pressure to the ambient pressure (elevated backpressure) can lower engine cycle efficiency significantly. In other special purpose applications, in particular at higher altitudes, the requirement to tie the system pressure to the ambient pressure (reduced inlet pressure) can reduce specific power significantly, and may also impact efficiency.

As a result, there has been a desire to become non-emissive and/or to have less of an adverse impact from the local ambient pressure, and much prior work on various closed or semi-closed power systems has occurred, resulting in a long list of patents. Historically (in the first part of the 1900's) this work was mostly related to the special purpose applications, more recently it is mostly about the ability to provide higher efficiency and/or effectively control emissions or even capture system emissions, in particular CO2. U.S. Pat. No. 9,194,340 B2, also by this inventor, incorporated by reference herein, provides the history and citation of relevant patents.

Pyrolysis and gasification systems generally fall into two categories: continuous feed machines, or batch (autoclave) type machines. The preferred machine will depend on the feedstock and to a large degree whether that feedstock can be effectively transported by conveyor, screw or other means into the reaction zone; when it is possible, the continuous feed type machine is preferred. U.S. Pat. No. 8,784,616 B2, with parent and child patents, provides a thorough set of citations to over a dozen patent and non-patent documents in this area.

3. Motivation to Improve the State of the Art

The levels of $CO_2$ in the atmosphere are rising, and that rise correlates to rapid industrial development beginning in the $20^{th}$ century, with levels rising from ~300 ppm, in the 1950's to over 400 ppm today. Systems which are much more than carbon neutral, and in fact highly carbon negative, but which still generate power are of interest since their operation at scale and over time would start to correct atmospheric $CO_2$ levels.

Carbon dioxide is a regulated pollutant in many locations. Other greenhouse gases such as NOx, and other components of engine exhaust, to include unburnt HC/methane, are also highly regulated. Fossil fuel burning engines, such as, for example, piston engines, gas turbines, or fossil fuel fired boilers produce between a little less than +1,000 to more than +2,000 lb. of $CO_2$ per MW-hour of energy production.

Renewable power, from sources such as, for example, hydro, wind, and solar are thought of as carbon neutral, since these sources emit zero $CO_2$ per MW-hr during operation. Nuclear power has the same carbon neutral attribute during operation; however, both renewable and nuclear are still carbon positive due to carbon release that occurs as a result of system fabrication, construction, and other support activities during operation.

Use of a renewable fuel, such as, for example, landfill gas, digester gas, bio-matter derived gas, in an engine is also thought of, or defined by regulators, as carbon neutral. Nevertheless, many of these engines have exhaust which is released to the atmosphere, and these "renewable fuels" create exhausts that are actually quite high in $CO_2$. Landfill gas is probably the worst, since it is about 50% $CO_2$ to start with, it physically results in +3,000 lb. $CO_2$/MW-hr release to the atmosphere. This is more than almost any coal plant, but still landfill gas power is thought of as renewable and carbon neutral.

Pyrolysis, the thermal decomposition of materials at elevated temperatures can create a carbon neutral fuel for the piston or turbine engine. The potential exists to create carbon negative power systems, which are both good for the environment, and lucrative for the developer/operator, by combining pyrolysis technology with carbon capture.

However, there are a number of problems and inefficiencies with pyrolysis which this invention seeks to address. In addition, the integration of present invention with semi-closed cycle engines will address similar problems and inefficiencies. These issues, include, but are not limited to: high cost of pyrolysis equipment due to exotic alloys used in construction; high portion of high value (gaseous) fuel that the pyrolysis system produces that must be used to sustain the required temperatures; lack of value from pyrolysis oil/tar generated from certain feedstocks; and emissions, to include $CO_2$ emissions and other regulated pollutants, from the burners used to sustain the required temperatures in pyrolysis reactors.

The semi-closed cycle (SCC) also has strengths and weaknesses which are addressed via this invention, via both SCC improvements and via the integration with pyrolysis. Those issues, include, but are not limited to: operation with levels of exhaust gas recirculation (EGR) that are too high can lead to creation of carbonic acid, as a result of $CO_2$ dissolving in any liquid water that might occur in the SCC; operation with high levels of EGR also typically requires a high purity oxygen source to compensate for the inert components, leading to higher oxygen cost and exotic oxygen plants; high EGR levels, when combined with higher purity oxygen mixtures, result in a working fluid which is radically different than air in terms of both density (due to molecular weight and other factors) and specific heat ratio; a working fluid radically different from air will in general require significant engine modifications in a piston engine (for example: compression ratio, valve timing) and in the case of a gas turbine new turbo machinery designed specifically for the SCC working fluid (for example: the high pressure supercritical CO2 turbines vs. air breathing conventional gas turbines); unless oxygen is wasted, the SCC will tend to have a lower exhaust O2 level than "design point" in excess air machines, to include lean burn piston engines and gas turbines; and if exhaust O2 levels are allowed to drop, to compensate for the additional working fluid brought back into the cycle via EGR, and to save on O2 plant costs, then at some point those levels will be too low to sustain combustion at all (O2 limit for flammability in methane is around 12%) and in nearly all cases modification to the engine control system and in the gas of the gas turbine combustion is required.

BRIEF SUMMARY

The invention provides an improved method and system of carbon sequestration in a pyrolysis system. To achieve this and other advantages and in accordance with the purpose of the invention, as embodied, the invention includes, in one aspect an improved pyrolysis piston engine semi closed cycle power system. A further aspect of this invention is that the system be compact, capable of operation at higher than ambient exhaust pressures, and that engine operation, heat recovery, oxygen generation, and gas clean-up be integrated in a fashion that improves efficiency and lowers capital cost.

The invention (1) improves the efficiency of the pyrolysis process, consuming less of the produced fuel to maintain temperature, 2) reduces the capital cost outlay for pyrolysis systems, and pyrolysis system related auxiliary components, 3) produces engine power in a manner that uses both the oil and fuel from the pyrolysis process, 4) captures carbon from the engine exhaust, 5) captures carbon and other pollutants from the pyrolysis exhaust, 6) operates the semi-closed cycle power system in a manner which does not require new major engine components (pistons/heads for piston engines or turbo machinery for gas turbines), or other significant engine modifications, 7) lowers and optimizes the cost of the semi-closed cycle, combined with pyrolysis, or standalone, and 8) widens the range of acceptable fuels in both the pyrolysis system and traditional engines, and 9) improves the efficiency of the carbon capture process. The combination of the aforementioned attributes will result in a highly net carbon negative power system when operating with a renewable feedstock, such as wood or municipal solid waste.

The Method and System of Carbon Sequestration invention described herein includes: an engine, of internal or external combustion type, operating on the semi-closed cycle, capable of burning fuel and generating power; a pyrolysis system, pre-heated by the engine exhaust, consuming excess oxygen in that exhaust, and operating at a lower temperature than is typical in pyrolysis systems, and consuming a small portion of the generated fuel, with all pyrolysis burner flue gas mixed with engine exhaust gas; a waste heat to power system, which generates additional electricity, while optionally providing hot dry gas for gas cleanup system regeneration; an exhaust cooling and water condensation system; a gas cleanup system, which dehydrates, compresses, and purifies the captured $CO_2$; an engine intake box, which creates an artificial atmosphere to support engine operation, such that engine design does not require changes to operate on this cycle, this cycle including, from the engine's perspective a nearly indistinguishable artificial atmosphere, with lower N2 compensated for by higher CO2 to support combustion and engine operation; and an "oxygen plant" which has a real purpose in this cycle of removing a portion of the nitrogen from air, not providing high purity oxygen.

The invention starts with the engine, which generally falls into one of three types, the rich burn piston engine, the lean burn piston engine, or the small gas turbine.

In the rich burn engine, which could be naturally aspirated, supercharged, and or turbo charged, the fuel mixture is controlled to create a fuel "air" mixture which is nearly stoichiometric, i.e. perfectly balanced, so that the products of ideal combustion are $CO_2$ and water ($H_2O$). In practice, the air fuel ratio controller is set to maintain a fixed CO or $O_2$ level in the exhaust, generally in the range of 0.5% CO (slightly rich) to 2.0% $O_2$ (slightly lean). A rich burn engine, operating with air and natural gas, will typically produce an exhaust mixture which is about 10% $CO_2$, with the balance mostly nitrogen and water vapor. Rich burn engines are always spark ignited.

A lean burn piston engine could include both compression ignition and spark ignition types. There are also "dual fuel" diesel engines wherein the diesel is ignited by compression ignition, which provides the equivalent of a spark, igniting the gaseous mixture. The lean burn engines generally run with a lambda value of 1.5 to 2.0. The rich burn engine is designed around lambda 1.0, the perfect stoichiometric ratio of fuel and oxygen. While running on air (21% $O_2$), a lambda 1.0 rich burn engine will have essentially zero $O_2$ in the exhaust, while lambda 1.5 will have ~5.25%, while lambda 2.0 (100% excess air) will have ~10.5% $O_2$. Diesel engines at part load, and gas turbines at all loads will generally have even higher exhaust $O_2$ levels, which also importantly means they have lower $CO_2$ levels, making carbon capture more difficult.

In the SCC, a combination of cooled EGR, which returns $CO_2$, $N_2$, and some $H_2O$ from the exhaust to the engine intake and air with some of the nitrogen removed create an artificial atmosphere, and hence working fluid, for the engine. This recirculation of exhaust concentrates $CO_2$, which enables the economic capture of carbon. Typical engine exhaust $O_2$ and $CO_2$ levels are shown in FIG. 10, in all cases with 21% $O_2$ (air or air equivalent including EGR) being supplied to the engine.

After condensation of the water, the $CO_2$ purity increases, and the last case represents about 70% $CO_2$ in the cooled EGR stream. In lean burn machines, piston or gas turbine, the 5-15% $O_2$ in the exhaust reduces the concentrations of $CO_2$ shown above in the SCC cases. The exhaust, which is typically 1,000 deg. F. in a rich burn engine, is then cooled, in some cases with that exhaust heat used to generated additional power, ultimately to the point where most of the combustion water condenses and is separated.

The cooled exhaust is still saturated in water vapor, typically at 100-130 deg. F., with 115 deg. F. being a design point inlet temperature good for piston engines. The cooled exhaust is mixed with the air, and or air and "oxygen" (enriched air with a portion of the nitrogen removed) to create the artificial atmosphere for the engine. Simulation and test data (for the rich burn) have shown that with modest levels of oxygen enrichment, of 22-50%, with 25-35% preferred, and with as a result more modest levels of EGR, that the engine will run quite well, without compression ratio or timing changes, and with little or no noticeable difference in specific fuel consumption.

A portion of the cooled EGR stream is diverted into the Gas Cleanup System (GCS) which has two functions. First, the rate at which exhaust is removed determines indirectly the rate at which the rest is recirculated, so the GCS helps manage EGR levels and engine intake $CO_2$ levels. Secondly, even in the case of the 91% $O_2$ source, the concentration of raw $CO_2$ in the EGR stream is too low for commercial applications or even economic sequestration. As a result, the GCS also has the functions of dehydrating the raw $CO_2$, and purifying the $CO_2$ by separating it from $N_2$, Ar, and $O_2$ that may still be present. Lastly, the GCS includes the components required to pressurize the $CO_2$ for sequestration or customer application. The GCS could be an amine-based $CO_2$ adsorption, molecular sieve capture, distillation (phase separation based), or combination. The choice of GCS technology is tied to the $CO_2$ levels, system size, and in some cases captured $CO_2$ specifications. Simple phase separation of $CO_2$ will require a high enough partial pressure of $CO_2$ exists that separation can occur without requiring cryogenic temperature, so 50-90% $CO_2$ is preferred with modest levels of compression. Amines and molecular sieves will physically work with very low $CO_2$ concentrations, including the 400 ppm of $CO_2$ in air, but for these processes to be economical greater than 14% $CO_2$ is required, hence, the SCC is required, more so for lean burn engines and gas turbines than rich burn, but some level of SCC and EGR is required to optimize any of these engines for carbon capture.

An enabling technology for economic carbon capture in the SCC is the oxygen plant, or more correctly the nitrogen removal plant. The engines employed in the SCC, regardless of whether they are rich burn piston, lean burn piston, or gas turbine, have a fixed design point, or range of acceptable operation, which requires a certain range of flowrate of working fluid. If one adds $CO_2$ to the working fluid via cooled EGR, unless one is trying to achieve a change in engine operations (this is sometimes done to reduce emissions) then one has to compensate for the additional $CO_2$, which is inert in the engine processes, by removal of about the same amount of $N_2$ (also inert) from the air. The type of oxygen plants can include but are not limited to Pressure Swing Absorption (PSA), Vacuum Pressure Swing, Absorption (VPSA), Membrane, or cryogenic distillation. All of the aforementioned, other than membrane (in a single stage) are capable of producing >90% purity $O_2$, the membrane plant produces 30-40% $O_2$, but also produces high purity $N_2$ at the same time. Of the four types, at the scale the invention is focused on, the VPSA has the best specific power, but second highest cost, and the membrane has the lowest cost, but worst specific power. The PSA and membrane have the advantage that they can produce $O_2$ at modest pressures (15-25 psig) without use of a booster compressor.

The hot exhaust needs to be cooled as part of the process, but can also be used as a source of heat to help regenerate molecular sieve beds or amines in the GCS, the exhaust waste heat can also be used to drive a waste heat to power system (optional), which will help offset the other auxiliary power requirements associated with the invention. As per U.S. Pat. No. 9,194,340, it is possible to design the waste heat to power system, in this case using $CO_2$ as the working fluid, and also bleed hot $CO_2$ into the GCS to regenerate the system, or use GCS captured $CO_2$ to augment working fluid in the waste heat to power system. Most waste heat to power systems prefer higher temperatures, and there are also techniques within U.S. Pat. No. 9,194,340 that increase exhaust temperature, modestly.

Finally, a pyrolysis system (optional) is part of this invention. Methods exist, in some cases patented, in others as known state of the art and articles of commerce, to generate fuels for piston engines or turbines via pyrolysis. Pyrolysis is the thermochemical decomposition of organic material, for example wood or municipal solid waste, in a vessel essentially devoid of oxygen at elevated temperatures. The thermal decomposition of biogenic and non-biogenic materials results in: 1) a low BTU gas (typically a blend of $H_2$, CO, $CH_4$, and $CO_2$), 2) in some cases an oil, and 3) in all cases a char/carbon solid product. All three products of pyrolysis have value, even the solid. In fact, the "charcoal" briquettes often used for outdoor grilling are manufactured via pyrolysis of wood.

A problem with prior art pyrolysis techniques is that a large fraction of the produced fuel, usually the gas, is consumed to maintain heat for the process, this is fine if your goal is charcoal briquettes, but not helpful if the goal is to run an engine. In this invention, the hot SCC exhaust, typically 1,000 deg F., but generally between 500 and 1500 deg F. depending on engine type, is used in lieu of air in the pyrolysis system burner. In the case of the rich burn engine, this will require some additional $O_2$ be injected into the SCC exhaust, but in the case of the lean burn engines or gas turbine, sufficient $O_2$ exists in the exhaust to support combustion yielding the required temperatures for pyrolysis. Better yet, consuming that $O_2$ will make our GCS system, per unit $CO_2$ captured, smaller, since $CO_2$ concentration will increase.

Specifically, for example, a lean burn engine, of about 5,000 hp might have 9% $O_2$ in the exhaust, at 815 deg F., while operating on the SCC with 38% purity $O_2$ before EGR. Adding fuel (from the pyrolysis) to this exhaust will raise the temperature to 2,300 deg F., and will increase hot $CO_2$ percentage to 23%, significantly reducing the size of the GCS.

Pyrolysis typically requires temperatures within the reaction zone, of 900-1800 F, consistent with the 2,000+ deg. F. firing temperature from the burner above. Typically, the designer will push temperature as high as possible, to increase gaseous component production, and to reduce the quantity of liquids or char. As a result, materials like Inconel are used in pyrolysis reactors. At elevated temperatures, 1600-1800 F, the Inconel or other exotic nickel alloys will have an allowable strength in terms of creep or time to rupture which is ~10× that of a typical stainless. These materials also have ~10× the cost of the typical stainless.

A reduction in the process temperature by ~300 deg F. will still process the feedstock, but will produce more oil/tar, and less gas, but enable the use of stainless steel. The presence of the oxygen in the exhaust, and ability to augment in the combustion zone with higher purity oxygen, enables the use of the pyrolysis oil as the heating fuel, so even though we can lower reaction temperatures within the pyrolysis reactor, and hence the temperature of the screw and other stressed components, we still produce about the same amount of net gas for use in the engine, since we do not use that gas to maintain reaction temperatures.

Lastly, even with the operation of the pyrolysis unit at lower temperatures, the exhaust from the pyrolysis unit will still be at higher temperature than the exhaust from the SCC engine would have otherwise been, and the flowrate of that exhaust is also slightly higher. The net result is that the power that can be produced in the waste heat to power component of the design is now increased, as a result of the addition of the pyrolysis subsystem. The combination of the aforementioned creates value in terms of getting to a highly carbon negative power system, at reduced capital and operating cost.

In summary, the invention is directed towards a semi-closed cycle carbon negative power system which includes an engine: rich or lean burn, piston or turbine; for generating power and exhaust gas; a molecular sieve based oxygen plant; a mixing vessel to allow mixtures of oxygen, cooled exhaust gas, and air to be created as the artificial atmosphere working fluid for the engine; a method of cooling the exhaust, combined with an exhaust water separator and demister; a molecular sieve based dehydration unit, operating on the TSA process, employing engine exhaust waste heat, directly or indirectly; and a molecular sieve based capture unit, operating on the Vacuum Pressure Swing Absorption (VPSA) process, wherein process gas is also used to regenerate Thermal Swing Absorption (TSA) beds.

Further the semi-closed cycle carbon negative power system includes a pyrolysis unit, with the following characteristics: a burner designed to consume excess oxygen from engine exhaust; a burner designed to use liquid pyrolysis products; a burner exhaust that is combined with the engine exhaust, enabling subsequent carbon capture, creating non-emissive pyrolysis system lower temperature operation, consistent with stainless steel construction, and increased oil/tar production In the cases where the SCC engine "dual fuel" (diesel natural gas) vs. spark ignition, additional pyrolysis oil produced can be used in lieu of or to augment diesel.

The invention also includes a waste heat to power unit, ideally $CO_2$ based, and operating on the Brayton cycle; wherein: a pressure ratio sufficient to cool exhaust to 300 F is employed; hot $CO_2$ bleed is used to regenerate portions of the system molecular sieves.

The invention also includes the oxygen plant operating via the membrane process, generating $O_2$ at a purity of 23-40% in a single stage; the oxygen plant operating via the Pressure Swing Absorption (PSA) or Vacuum Pressure Swing Absorption (VPSA); mixed $O_2$ and air levels between 23-28% $O_2$, yielding 15% $CO_2$ purity from rich burn engines; and requiring no engine changes. And, with mixed O2 and air levels between 23-50% $O_2$, yielding 20% $CO_2$ purity from lean burn engines, and greater purity from rich burn engines, requiring changes to engine control parameters only, no internal mechanical changes; with less than 21% $O_2$ purity at the engine inlet, requiring engine control (lambda setting) changes only.

The invention is also directed towards where low $O_2$ purity is compensated for by direct $O_2$ injection to portions of the engine; and where lower than desired exhaust $O_2$ purity is compensated for by direct $O_2$ injection to portions of the pyrolysis burner; and when operated with low $O_2$ purity, 23-45% $O_2$, such that the molecular weight and other key gas properties, such as specific heat ratio and density, remain compatible with the range of operation of small gas turbines, without change in turbo machinery or significant efficiency impact.

The invention also includes operation with reduced EGR and increased $O_2$, to enable piston engine operation on very low BTU fuels, generally as low as $\frac{1}{3}^{rd}$ of the normal minimum for that engine, typically to 150 BTU/SCF. Alternatively, the invention includes operation with increased EGR and in some cases reduced $O_2$, to enable piston engine operation, without knock or de-rate, on high BTU fuels, generally as high as that of pure propane or higher, up to 4000 BTU/SCF.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 10 is a table showing typical engine exhaust $O_2$ and $CO_2$ levels;

FIG. 11 is a table showing simulated results for a lean burn medium speed engine, in the 3 MW class;

FIG. 12 is a table showing results from chemical process flowsheet simulation of the SCC with EGR on a small industrial gas turbine, with methane fuel (no pyrolysis)

DETAILED DESCRIPTION

Figure 1:
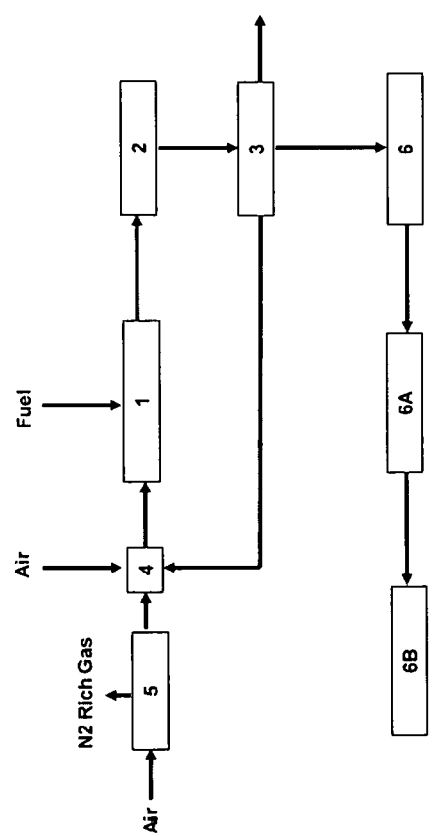
FIG. 1 schematically illustrates the basic components of a generic SCC power system, including $N_2$ removal, GCS, and compression.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

The present invention generally relates to a system of operating a compression ignition, spark ignition, rich or lean burn reciprocating piston engine, or lean burn gas turbine, in a semi-closed cycle, in a manner which is non-emissive, and which produces products, to include $CO_2$ at pressure and power, while processing its own fuel or a fuel for others via pyrolysis. The power system is fed with an integrated molecular sieve-based air separation unit which provides oxygen. (Alternatively, it could be fed with a membrane-based air separation unit, or a cryogenic based air separation unit).

Exhaust gas from the engine is reheated to consume $O_2$, and to provide a heat source for a pyrolysis reactor, the combined exhaust, from the engine and pyrolysis burner (e.g., $CO_2$, $N_2$, Ar, $O_2$, and water vapor, in various percentages) is recirculated to provide a combustion diluent and working fluid. System high grade waste heat is used to cool the exhaust (part of the process) and to generate additional power via a sub/super critical $CO_2$ Brayton cycle. Generated product, $CO_2$ is compressed, purified, and provided at pressure for the user, and also as a working fluid in the heat recovery system. The heat recovery system also in turn provides dry hot $CO_2$ for use in regenerating the gas purification thermal swing adsorption molecular sieves.

It is to be appreciated the invention is of particular use wherein both power and $CO_2$ at pressure are required for a process. Enhanced Oil Recovery is an example of such a process. It is further to be appreciated that the invention is applicable to two stroke or four stroke piston engines, rich or lean burn, rotary piston engines, or small gas turbines. Medium speed engines (which have greater time for the combustion process), and especially engines tolerant of operation at high "boost" (intake manifold) net mean effective pressure (such as medium speed opposed piston engines or heavy duty low to medium speed four stroke engines) are suited to the cycle but the invention is not to be understood to be limited to such medium speed engines.

Turning now descriptively to the drawings, in which similar reference characters denote similar elements throughout the several views:

FIG. 1 schematically illustrates the basic components of a generic SCC power system, including $N_2$ removal, GCS, and compression. Referring to FIG. 1, item 1 represents the engine, which consumes fuel, to produce power and an exhaust while breathing air (conventionally) or while breathing an artificial atmosphere, created by the combination of components of the SCC. Rich burn, spark ignited piston engines are a subset of the engines that could be used as item 1. Lean burn, spark or compression ignited piston engines are a subset of the engines that could be used as item 1. Lean burn engines are available in two or four stroke configurations. Some of the compression ignition variants are also offered dual fuel. Lean burn engines are available in small sizes, but the incentive herein would be to use a larger medium speed (900 rpm) lean burn engine.

The small gas turbine, which is also technically a lean burn engine, is a subset of the engines that could be used as item 1. The engine of item 1 could in theory have an exhaust oxygen level anywhere in the zero (rich burn) to 20% range (compression ignition engine at idle), but practically, 0-10% is the norm for piston engines, with 8-15% the norm for turbine engines, when air is used or more specifically when the oxygen content at the engine inlet is ~21%.

Still referring to FIG. 1, the engine item 1, feeds a system, item 2, which cools the exhaust (in certain cases while performing other functions), which then feeds an exhaust water separator, item 3, that ultimately separates most of the combustion water from the exhaust via condensation. The gaseous components of the exhaust are split within or downstream of item 3 and fed to item 4, the intake subsystem, and item 6, the gas cleanup subsystem.

Still, referring to FIG. 1, item 5 is a subsystem which provides an oxygen stream, typically 30-40% $O_2$ if a membrane plant or 90% $O_2$ if a PSA or VSPA plant, or 99% $O_2$ if a cryogenic plant, to item 4, the intake subsystem, which facilitates the mixing of the $O_2$ source, the cooled exhaust recirculation, and optionally air, to create the artificial atmosphere for the engine.

Still referring to FIG. 1, items 6, 6A, 6B, refer to stages that would occur in the gas cleanup system (GCS). These stages in the GCS can occur in differing order, depending on the raw $CO_2$ purity and system design, but generally it would be dehydration, item 6, followed by capture, item 6A, followed by compression, item 6B, to yield a $CO_2$ product of ~99% purity, at high pressure or stored as a liquid under pressure. The details of these processes will be discussed subsequently herein.

Figure 2:
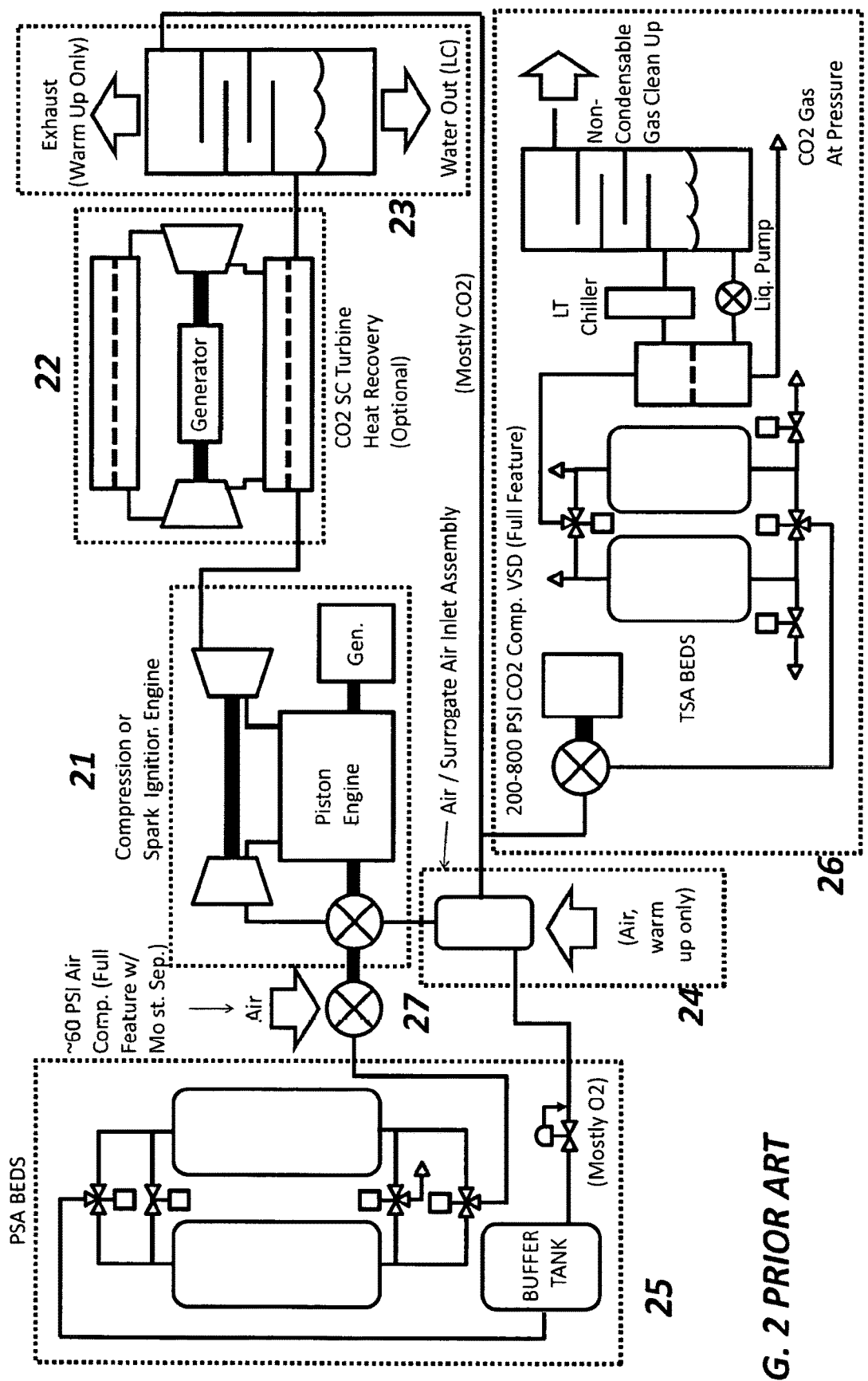
FIG. 2 schematically illustrates the components of an SCC Piston Engine power system, with PSA $O_2$ generation, SC $CO_2$ waste heat to power, and a GCS employing both TSA and phase separation.

Referring also to FIG. 2, which schematically illustrates the components of an SCC Piston Engine power system, with PSA $O_2$ generation, SC $CO_2$ waste heat to power, and a GCS employing both TSA and phase separation. Referring to FIG. 2, item 21, analogous to item 1 of FIG. 1, is the engine. Still referring to FIG. 2, item 22, the waste heat to power or "$CO_2$ SC Turbine Heat Recovery" subsystem cools the exhaust. Still referring to FIG. 2, item 23, is the exhaust water separator, which feeds cooled exhaust, with most of the water removed, back to the intake subsystem, item 24. The item 24 subsystem receives oxygen from item 25, which as depicted was a PSA oxygen plant, but which could have also been membrane, VPSA, or cryogenic.

Still referring to FIG. 2, item 26 is the GCS, this GCS, as depicted, has a dehydration portion based on a TSA process, followed by refrigeration, to liquefy and separate the $CO_2$ by phase separation. Item 26 could have also been all molecular sieve, amine based, or a combination. Finally, referring to FIG. 2, item 27 is the compressor, a subset of the item 25 oxygen plant, but in this case directly connected to the engine rather than electrically driven.

Still referring to FIG. 2, this design, with 50-90% $CO_2$ purity in the EGR loop, is consistent with a high purity $O_2$ source, in this case of about 90% from the PSA, without mixing air at item 24. These high raw $CO_2$ levels enable the phase separation GCS approach.

Figure 3:
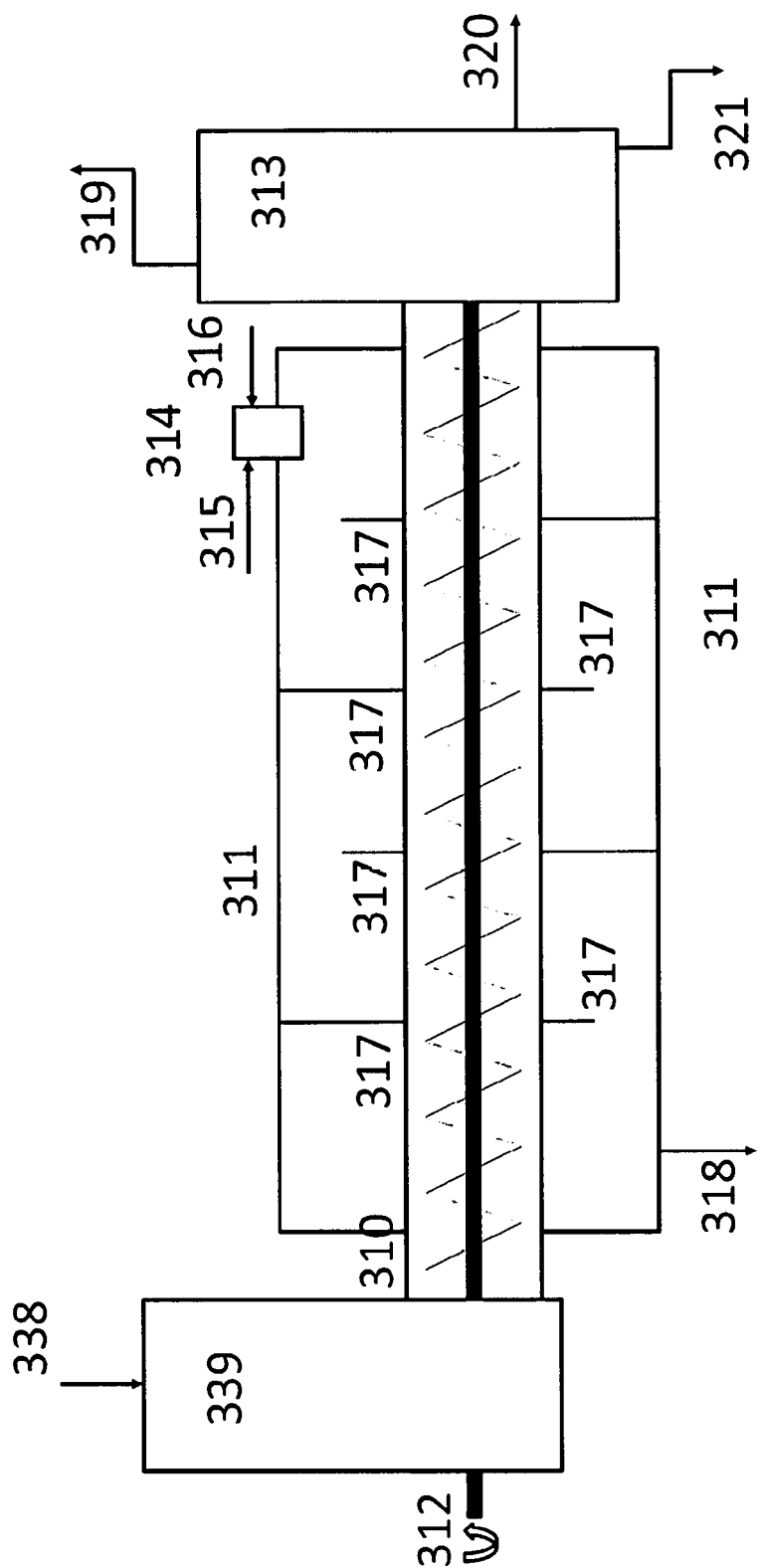
FIG. 3 schematically illustrates the basic components of a generic continuous feed pyrolysis reactor.

Referring also to FIG. 3 the FIG. schematically illustrates the basic components of a generic continuous feed pyrolysis reactor. Referring to FIG. 3, item 338 is the feedstock, which is fed into an inlet hopper and related components item 339. The feedstock for pyrolysis may include anything which is thermally decomposable in the temperature range of the equipment, to include coal, plastic, tires, municipal solid waste, auto shredder residue, or renewable feedstock streams, to include wood, paper, bio-mass, and other renewable waste streams. When the feedstock has a lower temperature decomposition point, and no ash content, like plastic, and when a continuous feed pyrolysis unit is used, it is important to also include ash, or an ash containing feedstock adder, like coal, so that there is a mechanical means to carry the feedstock through the process.

Still referring to FIG. 3, the pyrolysis reaction chamber is essentially a pipe, item 310, surrounded by a heating jacket, item 311, with a screw fitted, item 312, to carry the materials at slow speed through the process, feeding into a separator vessel, item 313.

Still referring to FIG. 3, a burner, item 314, fitted to the heating jacket, item 311, provides heat to the process, external to the pipe 310, such that the materials are exposed to heat only, in a near zero oxygen environment. The burner 314 is fed with air or an oxygen containing stream via item 315, and with a fuel, item 316. Baffles, items 317, exist within the jacket 311 to enable to some degree a counter flow heat exchange process from the burner 314 to the feedstock pipe, item 310. The pyrolysis burner exhaust, item 318, is typically vented to atmosphere.

Still referring to FIG. 3, the separator portion of the system provides item 319, the gaseous product, item 320, the liquid/tar product, and item 321, the char product to receiving equipment, not shown. In our preferred embodiment, item 320, the liquid product, which is not normally of much value, is provided as the fuel at item 316, or at least augments the fuel at item 316.

Figure 4:
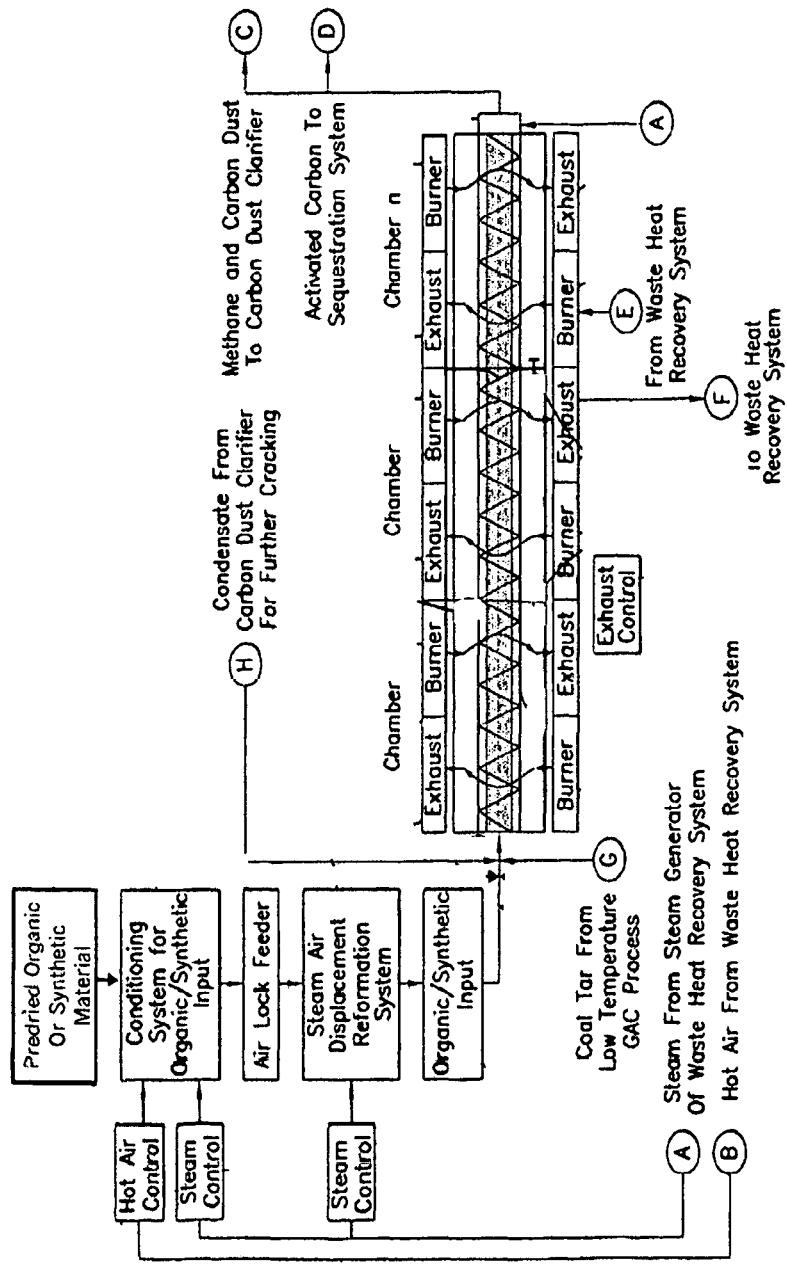
FIG. 4 schematically illustrates that an prior art implementation of the pyrolysis system is more complex, and can include multiple burners, exhausts, baffles, ducting, and components associated with the preparation of the feedstock.

Referring also to FIG. 4, the FIG. schematically illustrates that an actual implementation of the pyrolysis system is more complex, and can include multiple burners, exhausts, baffles, ducting, and components associated with the preparation of the feedstock.

Figure 5:
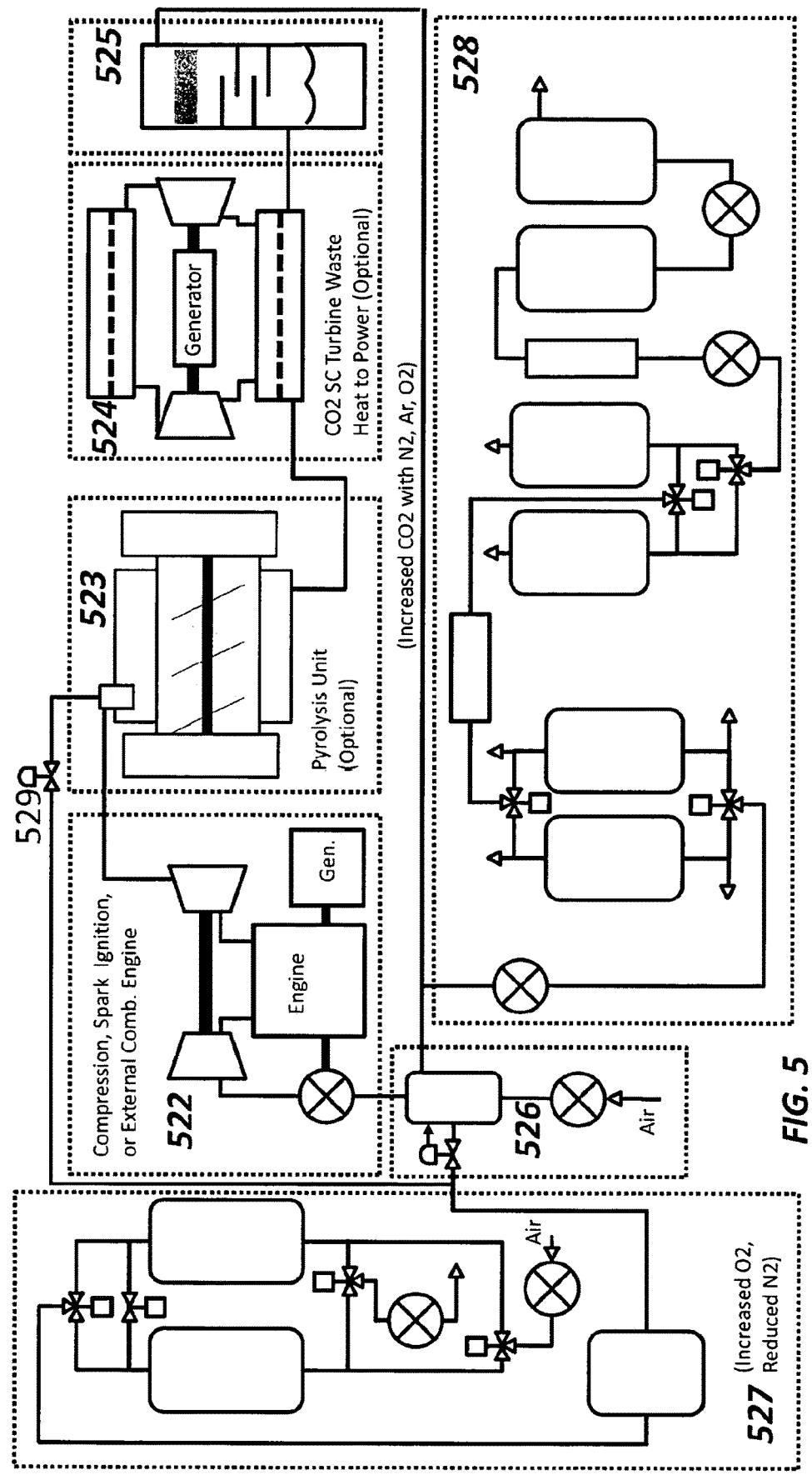
FIG. 5 schematically illustrates the components and arrangement of components in the invention, to include the SCC engine subsystem, pyrolysis subsystem, waste heat to power sub system, exhaust cooling and water separation subsystem, SCC intake subsystem, oxygen/nitrogen removal subsystem, gas cleanup subsystem with compression, and pyrolysis oxygen admission valve.

Referring also to FIG. 5 the FIG. schematically illustrates at the system level the components and arrangement of components in the invention, to include the SCC engine subsystem, pyrolysis subsystem, waste heat to power sub system, exhaust cooling and water separation subsystem, SCC intake subsystem, oxygen/nitrogen removal subsystem, gas cleanup subsystem with compression, and pyrolysis oxygen admission valve.

Still referring to FIG. 5, item 522 is the engine subsystem, which feeds hot exhaust gas, in the preferred embodiment, containing oxygen, from 5-15%, but nominally 9%, to the burner of the pyrolysis subsystem item 523. The pyrolysis exhaust, flows from item 523, to item 524, where it rejects heat to the SC $CO_2$ Turbine Waste Heat to Power subsystem.

Still referring to FIG. 5, from the waste heat to power system, item 524, the exhaust, now with additional raw $CO_2$, and reduced $O_2$, flows into the exhaust water separator, item 525, where the majority of the combustion water is condensed. This cooled exhaust is split into two streams, a portion of which flows to the intake assembly, item 526. Item 526, the intake assembly, mixes the cooled exhaust, air, and oxygen from item 527 to create the artificial atmosphere, for the engine, item 522.

Still referring to FIG. 5, a portion of the flow from item 525 is provided to the gas cleanup subsystem, item 528. Within item 528, the raw $CO_2$ is dehydrated, purified, compressed, and stored. Finally, item 529, a valve, is used to provide additional oxygen to subsystem 523, the pyrolysis subsystem, in those instances where engine exhaust is not sufficient alone (generally this is the case with rich burn engines only). The specifics of these subsystems, and their operation, leading to the claims, will be discussed in association with the more detailed FIG.s to follow.

Figure 6:
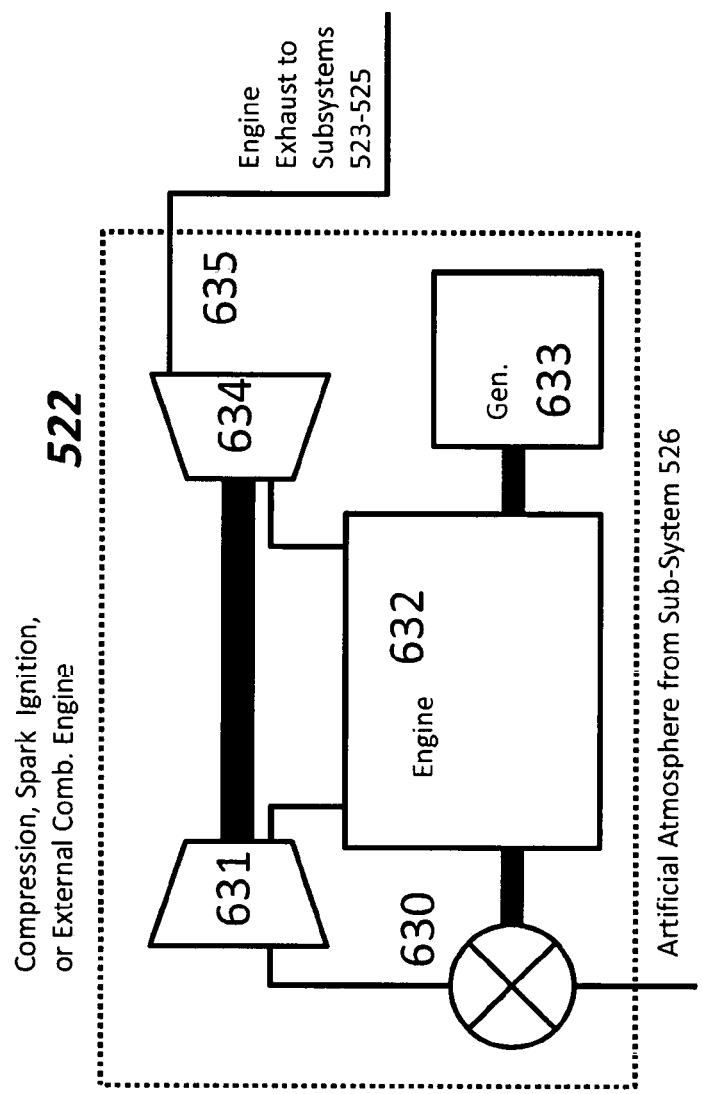
FIG. 6 illustrates the engine subsystem shown in FIG. 5.

Referring also to FIG. 6, the FIG. illustrates the engine subsystem, item 522, of FIG. 5. Still referring to FIG. 6, a shaft driven supercharger, or blower, item 630 (optional), feeds working fluid to the compressor of a turbo charger, item 631 (optional), to the engine, item 632. The engine 632 is coupled to the load, or in most cases to the generator, item 633. The turbo charger, item 634 (optional), turbine exhaust is fed to subsequent systems via item 635, the exhaust line. Typically, the engine, item 632, or engine intake, whether item 630 or 631 when present, is fed with very slightly sub-atmospheric pressure. Engine exhaust backpressure, at item 635, is generally only 2-7" inches of water higher than intake. However, the absolute pressure at the item 632 intake, or item 631 discharge, could be several atmospheres, with some engines running at turbo boost conditions that are >30 psig. It is recognized by those with experience in engine design, that cooling often exists between components, not shown herein, and which would in most cases not be changed as a part of the SCC. Intercoolers, which cool hot gas, would often exist between the supercharger, item 630, and turbo compressor, item 631. Aftercoolers, which also cool hot gas, would often exist between the turbo compressor, item 631, and the engine, item 632. Multiple stage turbo chargers, or multiple turbo chargers in parallel, are common and are not precluded herein.

As will be discussed later, operating sub-system 526, the intake subsystem, at a positive pressure, including a pressure as high as "turbo boost" pressure, and in doing so enable the engine 632, to provide its rated output, without the use of component items 630, 631, or 634, or the coolers associated with those components. When this is done, the temperature at item 635 would be higher, since it will be representative of item 634 inlet, not item 634 discharge, which in a medium speed engine at rated power are different by about 300 deg F. It will be appreciated the efficiency of the follow-on subsystems can be further increased, engine maintenance cost reduced, and reliability is improved.

Figure 7:
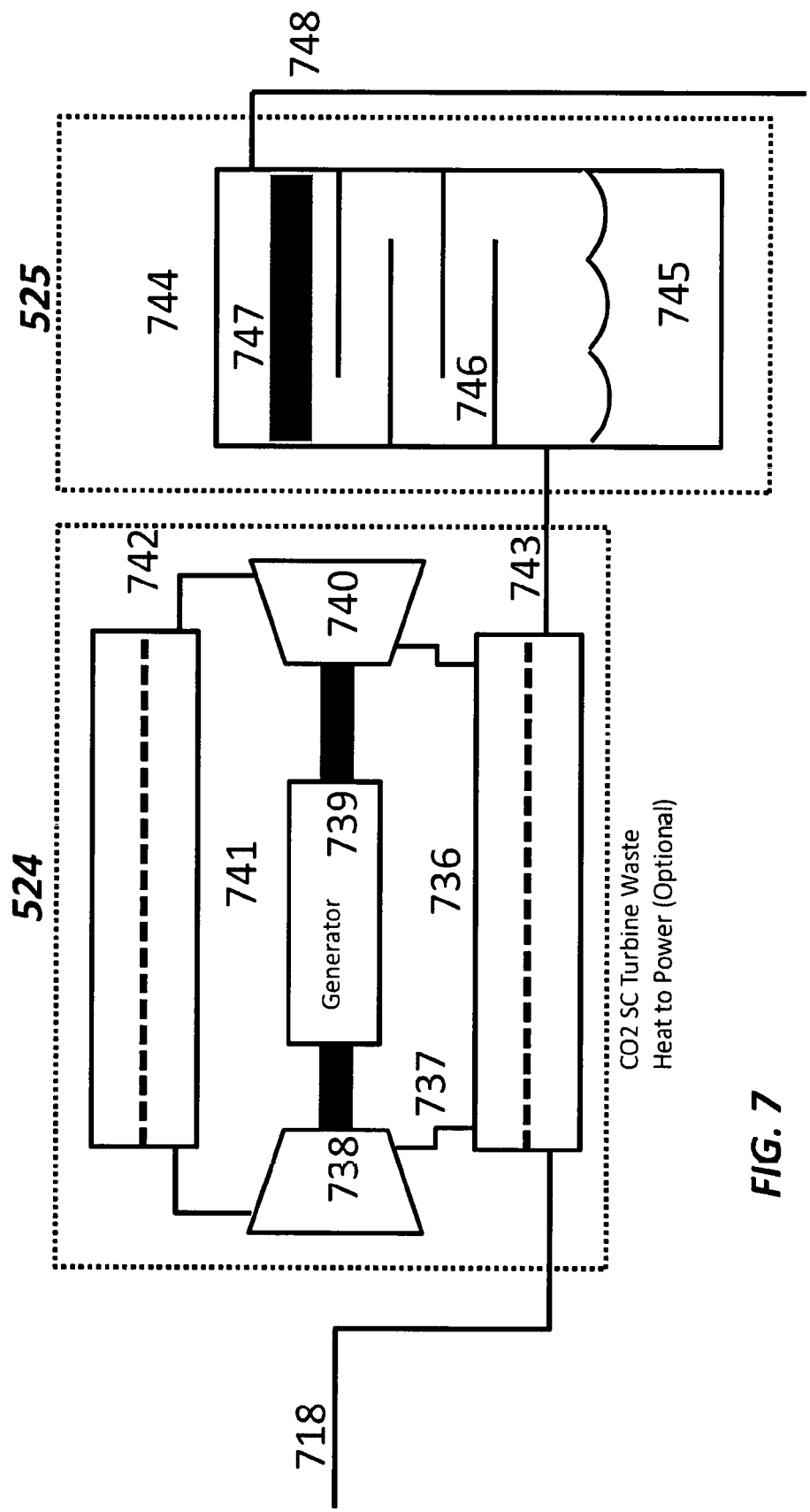
FIG. 7 illustrates the waste heat to power and exhaust water separator subsystems shown in FIG. 5.

Referring also to FIG. 7 the FIG. illustrates the waste heat to power and exhaust water separator subsystems of FIG. 5. Referring to FIG. 7, subsystem 524, the super/sub critical $CO_2$ Brayton cycle waste heat to power generator, receives the high temperature engine exhaust at point 718 via 318 when the pyrolysis is present, or directly at the engine exhaust 635 when it is not, and cools it via the hot-side heat exchanger, 736. This results in conditions at point 737, the Sub-system 524 turbine inlet, of 1050 F (about 50 deg F. lower than exhaust temperature), and supercritical pressure, nominally 6000 psia.

Still referring to FIG. 7, sub-system 524 uses pure $CO_2$ as the working fluid. The fluid is expanded through turbine 738 to 1200 psia (at design point), driving generator 739 and compressor 740. Low side heat exchanger 741 cools the supercritical $CO_2$ to approximately 110 F at point 742. The working fluid ($CO_2$) is recompressed in compressor 740, and is provided at approximately 6000 psia, 275 F to the heat exchanger 736. The net result is that piston engine exhaust has been cooled from 1100 F at point 35 or 718 to 300 F at point 743. Note, all these pressures and temperatures are estimates at design point, and would vary with load. Also note, a closed supercritical $CO_2$ Brayton cycle heat recovery system is controlled via management of the load at generator 739 (runs at constant speed, hence constant pressure ratio), and by varying the total mass in the cycle. While 1200 psia inlet, 6000 psia outlet might be the compressor design point at full power, at 1/10th power one would expect nominally 120 psia, and 600 psia at the same points—and cycle efficiency would in theory be unchanged (in fact it degrades slightly, since the cycle is closer to optimum at supercritical pressures). Other choices in pressure ratio, and heat exchanger design pressure are of course possible. The pressure ratio of 5 is not optimum for the Brayton cycle alone, but gives reasonably low compressor exit temperatures, enabling good use of the available engine or engine and pyrolysis sub-system exhaust waste heat.

Still referring to FIG. 7, subsystem 525, the exhaust water separator, item 744, consists of a liquid sump, item 745, which usually includes a submersible high flow pump, and level control system (not shown). The hot water from item 745 is cooled, via heat exchanger, not shown, and injected into line 743 upstream of this subsystem. This enables the 300 deg F. discharge temperature from item 524, line 743, to be reduced quickly, to ~115 F, using to ~100 F water from item 745. Different design points on water temperature, flow rate, and change in temperature as a result of water spray are possible, and seasonal variation, and power level-based variation, are likely to occur. The exact water temperature, and hence gas temperature, within subsystem 525 are selected to manage the water vapor partial pressure, so that condensation of water is prevented at all points in the engine, and so that corrosion does not occur. Item 744 also includes baffles plates, item 746, and demister pad, item 747, which work in concert to provide a saturated, but gaseous cooled exhaust, at the item 748 EGR line.

Figure 8:
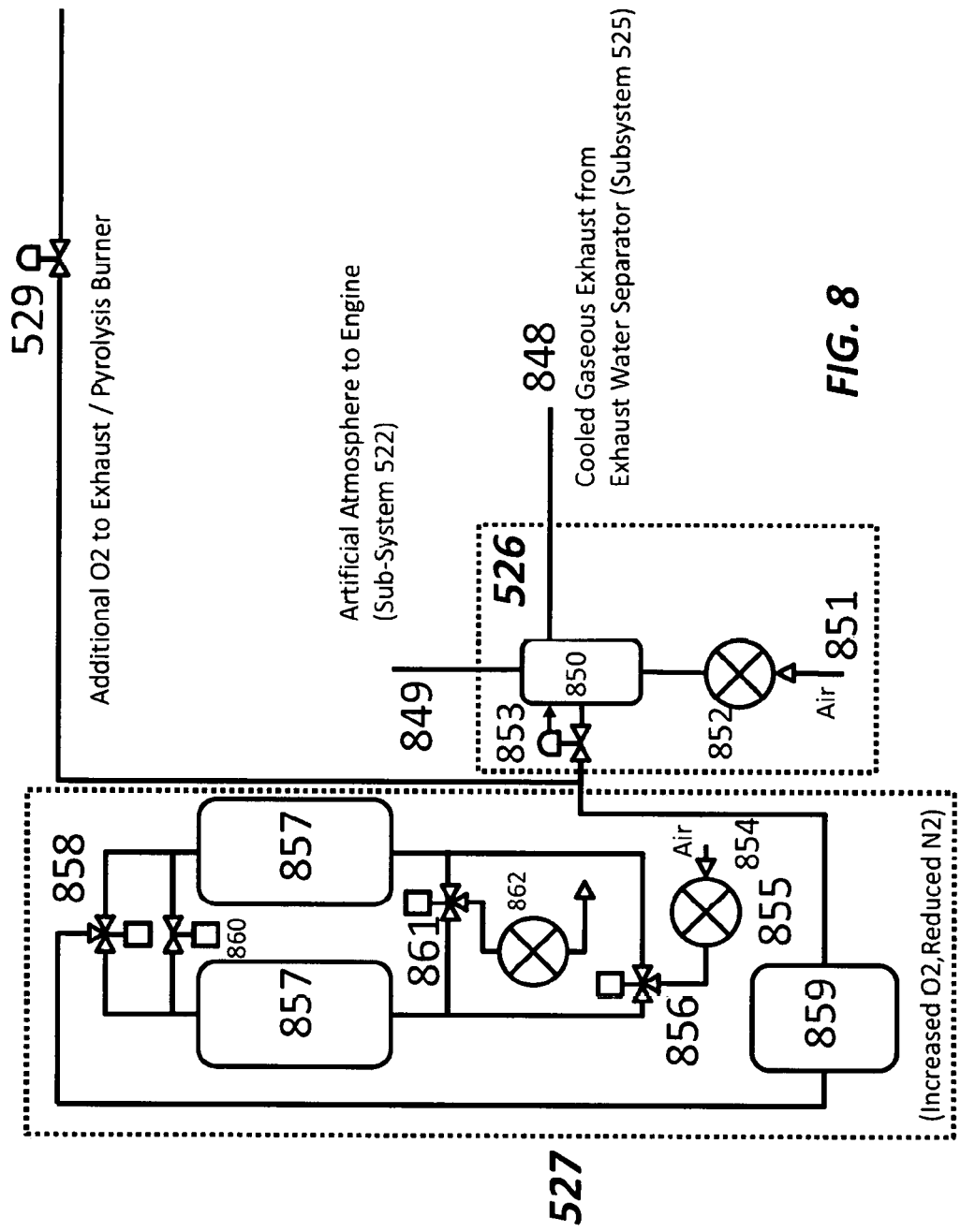
FIG. 8 illustrates the SCC intake, oxygen plant (nitrogen removal) subsystems, and the additional $O_2$ to pyrolysis valve shown in FIG. 5.

Referring also to FIG. 8, the FIG. illustrates the SCC intake, oxygen plant (nitrogen removal) subsystems, and the additional $O_2$ to pyrolysis valve shown in FIG. 5 (items 526, 527 and 529). Referring to FIG. 8, the cooled exhaust, item 848, with water removed (other than vapor) enters the intake subsystem, item 526, which creates the artificial atmosphere for the engine, at item 849. The intake subsystem consists of a pressure vessel, item 850, with a water drain for any condensate, which is fed air, item 851, optionally through a blower, item 852. When the blower, item 852, is present, it is possible to operate the SCC EGR system at positive pressure, up to the normal rated turbo boost pressure for the engine. When the blower is not present, the item 850 vessel is normally open to air, and runs slightly sub atmospheric, drawing in air as is required.

Still referring to FIG. 8, the subsystem 526 intake sub-system receives oxygen, from 30-90+% purity, depending on oxygen source type and design point, at valve 853. This oxygen line is also provided via valve 529 to the pyrolysis burner (sub system 523) in those instances where the burner requires additional oxygen. Also, it is recognized that a pyrolysis system may have multiple burners, and hence the potential exists for multiples of item 529. Furthermore, in some engines, it may be advantageous to operate that engine with the bulk $O_2$ level at item 849 substantially lower than 21%, however the flammable limit of the fuel of choice and oxygen (e.g. methane minimum $O_2$ level is 12%) may dictate that additional $O_2$ is bled into the engine at a spark cell, or combustor can, especially to aid in starting, or off design point operation.

Still referring to FIG. 8, the oxygen subsystem, item 527 is depicted as follows. Air, item 854, is fed to a blower, item 855, and then to a valve assembly, item 856, which depending on timing then flows into molecular sieve vessels, item 857. The molecular sieves absorb $N_2$ preferentially and a stream of enriched oxygen (reduced $N_2$) is provided via valve assembly 858, to buffer tank 859, leading to the discharge valve, item 853.

Still referring to FIG. 8, periodically, the molecular sieve vessels 857 will be saturated with $N_2$ and other undesired components of air, and when it is saturated, or calculated to be approaching saturation, the active vessel is switched via valve assembly items 856 and 858. Frequently equalization valves, item 860, are opened briefly to prevent surging or bed lift due to rapid pressure changes. The bed not on line is recharged ($N_2$ and other contaminants removed), via valve assembly item 861 and vacuum pump item 862. Typically, the pressure ratio on a VPSA oxygen plant is 3 or 4 to 1, hence a 7.5 psia vacuum at item 862, is matched by a ~25+ psia (11 psig) blower at item 855.

Figure 9:
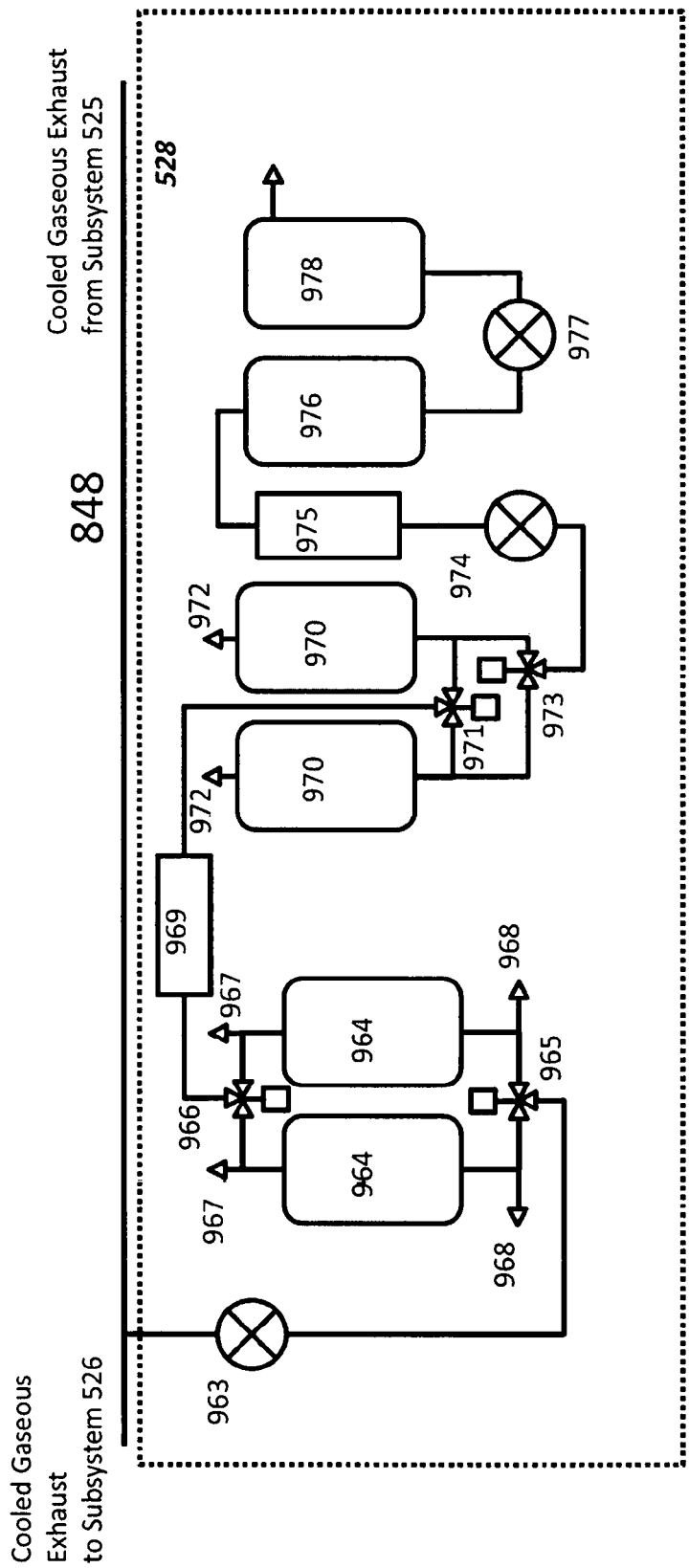
FIG. 9 illustrates the GCS subsystem shown in FIG. 5.

Referring also to FIG. 9 the FIG. illustrates the GCS subsystem 528 shown in FIG. 5. Referring to FIG. 9, a two-stage molecular sieve-based GCS is depicted. Before discussing the details of subsystem 528, it is important to discuss system design and operational trades. As per U.S. Pat. No. 9,194,340 B2 and other work, it is possible to design a SCC power system with raw $CO_2$ levels in the cooled exhaust that exceed 50%. In theory, with a 100% $O_2$ source, and no air admission, it would be possible to have nothing but $CO_2$ and water vapor in item 848. The purity of $CO_2$ would then be mostly a function of the partial pressure of water. If line 848 was at 15 psia, and partial pressure of water was 3 psia, ~140 deg F., then we would have 80% $CO_2$ by volume in line 848. In this case, it would be preferred from the GCS perspective to just compress, dehydrate, and liquefy the $CO_2$, exactly as is depicted in FIG. 2. Taken to an extreme, if in some other type of engine, line 848 were at greater than 300 psia, then the $CO_2$ purity would be at 99%, before the GCS. Both of these power systems, with 80% or 99% raw $CO_2$, would require a near 100% $O_2$ source, which can pretty much only be cryogenic, and which would make it quite costly, especially at the scale focused on by this invention. The invention is further focused on distributed power, vs. large stationary power plants, this is tied to both the need to be proximate with the source of fuel, and with the location for $CO_2$ sequestration or use. As a result, though one could in theory apply this invention and technology in a broad range, the discussion herein will be focused on mobile or semi-permanent or modular power systems, to include piston engines, or rich burn or lean burn type, generally with outputs from ~500 kW to ~5 MW each, and small gas turbines, from small industrial machines to smaller aero derivative gas turbines, generally well under 30 MW in output. As a result, our invention is but one use of these machines, and our invention is too small to justify significant (if any) changes to the designs of these machines from an economic perspective, as a result, our invention stresses the pyrolysis and SCC components in a direction which result in as few modifications to the standard engines as is possible.

Alternatively, lower cost oxygen sources, or smaller oxygen sources, where that oxygen is blended with air at subsystem 526, radically reduce oxygen plant costs. Operation with low purity oxygen also opens up an entirely new class of oxygen sources, membranes, which struggle to produce oxygen levels of greater than 40% by volume. Use of lower purity $O_2$ will increase GCS costs, but there is still a net savings. These lower oxygen purity cases, with lower raw $CO_2$ levels, can still be made compatible with economically viable GCS systems, and with changes to engine parameters in terms of molecular weight, specific heat ratio, intake density, such that the engine operation with the SCC falls within the parameters of the original engine design. In some cases, where the engine is already running with a fairly high $CO_2$ level in the exhaust, the level of oxygen enrichment and SCC recirculation is quite low.

For example, an engine run with exhaust $CO_2$ near 10%, air breathing. This is too low for an economically viable molecular sieve capture, but not radically so. A modest increase in $O_2$ levels to 25% prior to EGR will enable 14% raw $CO_2$ levels, and with 35% we get 21% raw $CO_2$.

The table shown in FIG. 11 shows simulated results for a lean burn medium speed engine, in the 3 MW class. As can be seen, modest $O_2$ levels, of 36 to 43%, are sufficient to get CO2 levels after water removal to near 20%, and that is while exhaust $O_2$ is kept at the design conditions of Tambda 2.0. It is reasonable to lower this number, still lean burn, but consistent with the flammability index, and get $CO_2$ levels to 25%, almost 5× air breathing.

Similar results are of course the case for gas turbines, which are exclusively lean burn. Given that the oxygen plant is the most expensive part of the invention, optimization of the system will often occur with lower levels of oxygen, but larger GCS systems. In the case of the gas turbines, since exhaust $O_2$ levels are normally 10-15%, deviation from design point $O_2$ is often required to get to the same levels of raw $CO_2$ above, but these deviations are not unreasonable.

More significantly perhaps, SCC EGR increases intake density due to presence of $CO_2$, but it reduces it due to presence of water, and due to higher temperatures. The net change in intake density is not significant, and in fact is within the range of the gas turbine design, even for relatively large EGR ratios, since so much of the EGR flow is still $N_2$. The most significant change for the small industrial gas turbine, or small aero derivative turbine, especially for single shaft designs, is that of de-rate due to higher than ISO inlet temperatures. These de-rates are significant, up to 25% of rated power, but the alternative avoided is design of a completely new gas turbine, for a small market, at a small size, which is clearly a non-starter.

Results from chemical process flowsheet simulation of the SCC with EGR on a small industrial gas turbine, with methane fuel (no pyrolysis) are summarized in FIG. 12 and indicate that with the mixture of $O_2$ and air, and large amounts of SCC EGR, we can both concentrate $CO_2$, enabling the GCS operation, with only very modest changes in molecular weight. This will get much better in terms of $CO_2$ concentration when the pyrolysis is added. Note: the cases with the SCC atmosphere lower than 12% will require direct admission of the $O_2$ into the combustor, which in this particular turbine is easily achieved.

With the above as background, referring again to FIG. 9, subsystem 528, as depicted, consists of a two-stage molecular sieve-based dehydration and capture system. Item 963 is a blower, with a typical discharge pressure of 25-30 psia. In the instances where line 848 is already operating at this pressure or greater, this component is not required, and is replaced by a control valve. The blower, item 963 includes a discharge heat exchanger, and water separator, to drop out additional liquid water. Molecular sieve vessels 964 are served by valve manifolds 965 and 966, driven by timers, to feed the appropriate vessel 964. The vessels, the most common number in our designs is 3, are all serviced by ports 967, and 968. Item 967 connects to a hot dry gas supply, which could be provided directly via a port at the subsystem 524 turbine 738, or could be provided alternative as follows later herein.

Still referring to FIG. 9, the port at item 968 is vented to the atmosphere, and will consist of water vapor, and inert gas. Three vessels are the norm since this enables one vessel to be on process, one being heated with hot dry gas to regenerate, and one cooling off passively getting ready to process again. This can also be accomplished with two vessels, but the vessel size has to be a little greater.

The absorption process creates heat, 1800 BTU/lb. on molecular sieves 964, so the effluent dry gas from the TSA is fed into the next stage, the VPSA capture system, via heat exchanger 969. As currently implemented, the GCS is served by a chilled water loop, but air-cooled heat exchangers are possible, depending on system location and other specifications.

Still referring to FIG. 9, items 970, served by valve manifolds 971, 972, and 973, are the VPSA capture vessels. These are loaded with molecular sieves that captures $CO_2$, CO, HC, NOx, and are oversized, and as such capture all regulated pollutants, making the system non-emissive. The levels of CO, HC, and NOx, normally a problem in engine exhaust in terms of release to the atmosphere (ppm levels), are not a problem for the sequestration or EOR application. Vacuum pump 974 periodically removes the captured $CO_2$ and other trace gases, and delivers it via a heat exchanger 975 to a buffer tank 976, then on to a multi-stage compressor 977 and storage tank 978.

Figure 13:
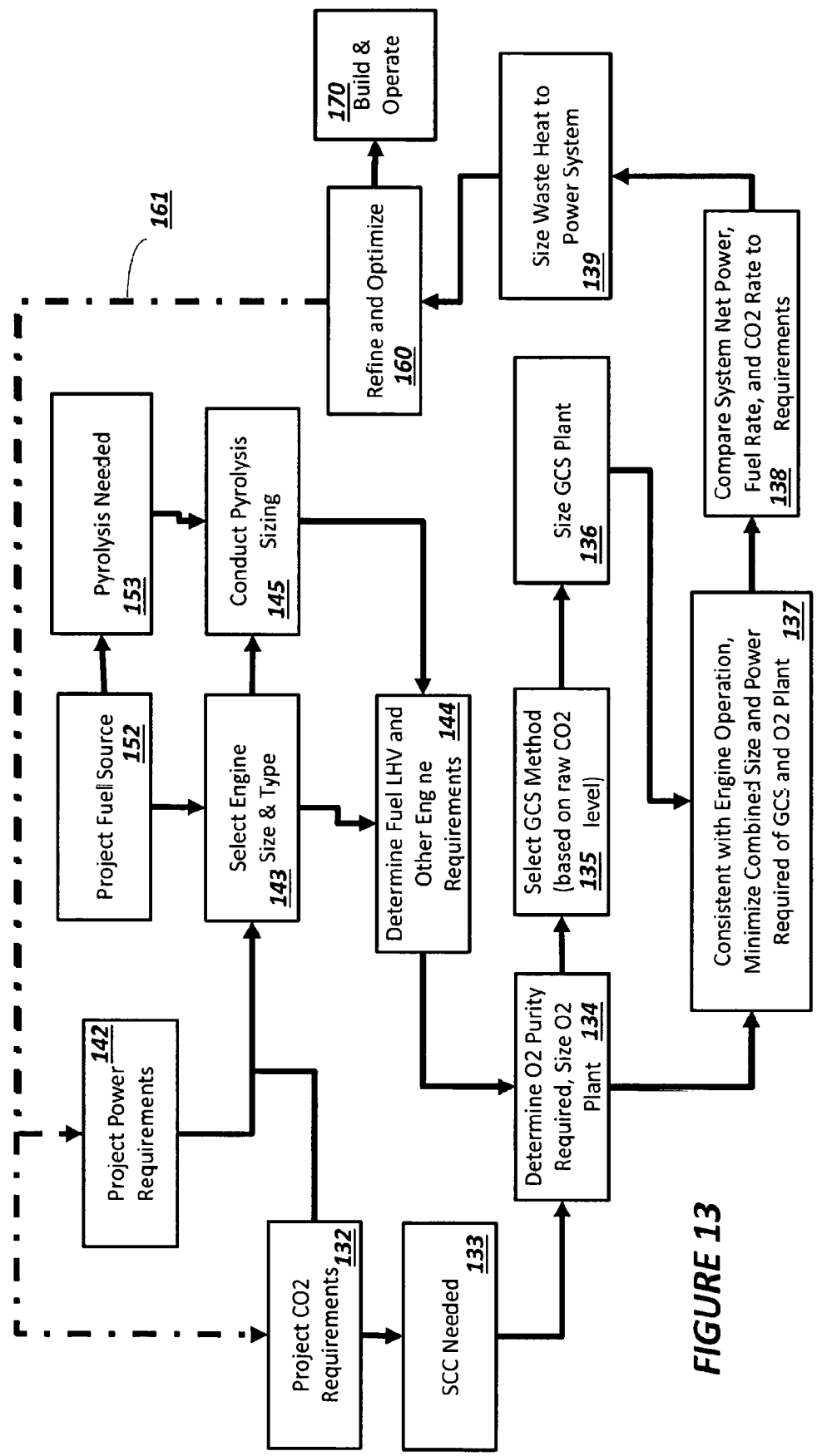
FIG. 13 is a flow chart showing one method for an improved method and system of providing a carbon negative power system in accordance with the present invention described herein.

Referring also to FIG. 13 there is shown one method for providing a carbon negative power system in accordance with the present invention described herein. Three input steps drive the method flow chart, Step 142 projects power requirements; Step 152 projects fuel source, and Step 132 projects $CO_2$ requirements. Step 132 is used for determining SCC needed, step 33. The projected $CO_2$ requirement is also used with projected power requirements, step 142 to select engine size and type, step 143. Determining SCC, step 33, is used with step 144, determining Fuel LHV and other engine requirements to determine the $O_2$ purity required and the size of the $O_2$ plant, step 134, which drives the selection of the GCS method, step 135 and the size of the GCS plant, step 136. Steps 134 and 136 lead to step 137 which minimizes the combined size and power required of the GCS and $O_2$ plants. Step 138 compares system net power, fuel rate, and $CO_2$ rate to requirements, the output of step 138 drives step 139, sizing the waste-heat-to-power system. The projected fuel source, step 152 determines if pyrolysis is needed and step 145 along with step 143, engine selection and sizing determine Pyrolysis sizing. Step 160 refines and optimizes and as necessary reiterates via path 161 before building and operating the carbon negative power system 170.

Other System Attributes

There are other system attributes and unique benefits that can only be discussed at the system level, referencing multiple FIG.s. The ability to use a fuel in an engine is tied to that engines fuel specification, which could include, obvious things like pressure and temperature, but also minimum heating value, maximum heating value, methane number, Wobbe Index (WI), contaminant levels (e.g. $H_2S$), among other parameters. The ability to change the artificial atmosphere, to include lower or higher than 21% oxygen purity, or greater or lesser EGR, can change the tolerance of the engine. Specifically: $CO_2$ reduces knock, so hotter fuels can be used with more EGR; inerts in the fuel, or said another way low fuel heating value, can be compensated for by removing inerts from the artificial atmosphere, by reduction of EGR, increase of $O_2$, or both; flame out situations, due to low $O_2$, or other mixture related problems, can be compensated for by adjusting the bulk artificial atmosphere, or by direct injection of $O_2$ (e.g. into the combustor can or spark cell).

Pyrolysis, especially lower temperature pyrolysis, will not make perfect pipeline quality fuels, and will make fuels that change as a function of feedstock, which unless you are supporting some type of factory will tend to vary seasonally and with weather (moisture levels, chemical composition). The ability of the SCC engine to adjust to varying fuel parameters enables the more complete use of the pyrolysis feedstock resource.

Operation at higher SCC EGR pressures, which are still less than turbo boost pressure, which seems like a radical change in engine design, is actually very beneficial to this cycle. All of the plumbing gets smaller, components such as blower 963 are eliminated, the power level at blower 852 is lower than blower 963 would have been, the higher pressure reduces the relative partial pressure, and hence water vapor content, and often the oxygen plants have the inherent ability to delivery $O_2$ at this modest pressure.

Elimination of the turbo charger, via operation at higher SCC pressures, will enable an increase in the already increased pyrolysis efficiency, since exhaust will be hotter by ~300 deg F., and will also tend to increase the amount of power that can be generated via subsystem 524, the waste heat to power subsystem.

Lean burn piston engines are more efficient than rich burn piston engines, but have a problem in the SCC associated with high exhaust $O_2$ levels. As described herein, the combination of the lean burn piston engine with pyrolysis solves that problem, and also makes the pyrolysis system non-emissive.

Gas turbine engines are not more efficient in the small sizes than lean burn piston engines, but they have higher exhaust temperatures, and much higher exhaust $O_2$ levels, which can result in the same beneficial integration with the pyrolysis system, and much greater benefit when integrated with the waste heat to power subsystem.

What is claimed is:

1. A semi-closed cycle carbon negative power system comprising:
    an engine subsystem;
        semi-closed-cycle (SCC) oxygen plant subsystem connectable to the engine subsystem;
        an intake subsystem connectable to the SCC oxygen plant subsystem; and
        a gas cleanup system (GCS) connectable to the SCC oxygen plant subsystems,
        a pyrolysis subsystem connectable to the engine subsystem;
        a waste-heat-to-power subsystem connectable to the pyrolysis subsystem;
        an exhaust water separator subsystem connectable to the waste-heat-to-power subsystem;
        an inlet hopper;
    a pyrolysis reaction chamber, the pyrolysis reaction chamber comprising:
        a pipe;
        a heating jacket surrounding the pipe;
        a separator vessel, wherein the separator vessel provides a liquid/tar product, a gaseous product, and a char product;
        a screw concentric the pipe for moving material through the pipe to the separator vessel; and
    a burner connectable to the heating jacket, and wherein the separator vessel is connectable to the burner and wherein the burner is designed to use liquid pyrolysis products.

2. The semi-closed carbon negative power generation system as in claim 1 wherein the gas cleanup system (GCS) comprises:
    a two stage GCS molecular sieve-based dehydration and capture system operating on the Thermal Swing Absorption (TSA) beds process;
    a GCS blower connectable to the two stage GCS molecular sieve-based dehydration system; and
    a heat exchanger connectable to the two stage GCS molecular sieve-based dehydration system.

3. The semi-closed carbon negative power generation system as in claim 2 wherein the gas cleanup system (GCS) further comprises:
    at least two Vacuum Pressure Swing Absorption (VPSA) vessels connectable to the heat exchanger;
    a vacuum pump for removing captured gases from the VPSA vessels;
    a buffer tank connectable to the vacuum pump;
    a multi-stage compressor connectable to the buffer tank;
    a storage task connectable to the multi-stage compressor; and
    wherein captured gases are also used to regenerate the TSA beds.

* * * * *